UNITED STATES PATENT OFFICE.

WILHELM MAJERT, OF BERLIN, GERMANY.

STABLE HYDROSULFITE MIXTURE AND METHOD OF MAKING SAME.

No. 861,218.  Specification of Letters Patent.  Patented July 23, 1907.

Application filed December 24, 1906. Serial No. 349,274.

*To all whom it may concern:*

Be it known that I, WILHELM MAJERT, a subject of the King of Prussia, residing at 17 Belle-Allianceplatz, Berlin, Germany, have invented certain new and useful Improvements in Processes of Making Stable Hydrosulfite Mixtures; and I do hereby declare the following to be a full, clear, and exact description of the invention.

My invention relates to a process of making stable hydrosulfite mixtures.

It is well known that hydrosulfites decompose slowly in cold dilute solution and more quickly when heated, into thiosulfate and bisulfite according to the following equation in which R indicates monovalent metal

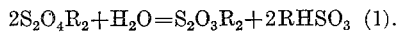
$$2S_2O_4R_2 + H_2O = S_2O_3R_2 + 2RHSO_3 \quad (1).$$

In an absolutely dry state the sodium salt is not subject to this intermolecular conversion. Nevertheless it is so sensitive to the action of the oxygen in the air that when heated it rapidly oxidizes and becomes unfit for use.

The products of the combination of the acid hydrosulfites with aldehydes and ketones, particularly the oxymethylene sulfonate of sodium, form very stable compounds. But they are rendered unfit for many of the purposes for which they are used by the presence of formaldehyde. They have for example, almost no disinfecting properties, even the usual disinfecting power of the formaldehyde being completely suppressed. Furthermore, aldehydes are expensive substances, the price of which is many times higher than that of hydrosulfites.

I have discovered that the conversion which takes place according to the above equation (1) is brought about as follows: A small quantity of hydrosulfite is oxidized to bisulfite by the action of a trace of atmospheric oxygen. Thus:—

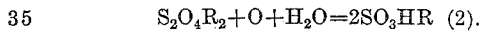
$$S_2O_4R_2 + O + H_2O = 2SO_3HR \quad (2).$$

The acid of the bisulfite thus formed acts on hydrosulfite liberating free hydrosulfurous acid

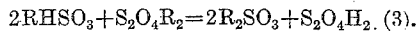
$$2RHSO_3 + S_2O_4R_2 = 2R_2SO_3 + S_2O_4H_2 \quad (3).$$

The free hydrosulfurous acid is not stable, however. It decomposes with water as in equation (1) into sulfurous and thiosulfurous acid and the acid thus formed acts again on hydrosulfite. This process repeats itself therefore, until the hydrosulfite is completely decomposed.

Now I have found that the hydrosulfites are rendered exceedingly stable and their decomposition practically obviated when a small amount of caustic alkali or of a socalled neutral salt of an acid weaker than sulfurous or hydrosulfurous acid, such as a carbonate, borate, basic phosphate, etc., is added to the hydrosulfites. The following experiments demonstrating this fact were made. Six solutions were made each containing an equal proportion of sodium hydrosulfite. Solutions $a$, $b$ and $c$, contained only hydrosulfite of sodium. Solution $d$ contained also some sodium carbonate: solution $e$ some disodium phosphate: and solution $f$ some sodium borate. Solution $a$ consumed 18cc of a solution of ferrocyanid of potassium with an addition of sodium hydroxid. Equal quantities of the solution $b$, $d$, $e$ and $f$ were heated in the same water bath. Solution $b$ was totally decomposed in a quarter of an hour, whereas the solutions $d$, $e$ and $f$ showed no signs of decomposition even after hours. The solution $a$ remained standing in the cold and was likewise completely decomposed over night; it smelled strongly of dioxid of sulfur just as after heating the solution $c$. The favorable effect of the continued presence of the free alkali and of the salts which have an alkaline reaction was thus clearly proven.

It is to be noted that my process is quite distinct from the "salting out" processes in which a strong alkali-lye is used to separate the hydrosulfite from a solution in anhydrous form, or to deprive hydrous salts of the water of crystallization. In such a process the alkali plays the same part with respect to the hydrosulfites as sodium chlorid with respect to dye stuff solutions. As sodium chlorid precipitates the dye stuffs so in these processes, the alkali-lye acts merely to precipitate the hydrosulfites in an anhydrous state. This "salting out" results from the largely increased sodium salt concentration. On the other hand the sodium or other salt which I use plays no such part, being introduced merely for their alkaline property and they are retained permanently as an admixture so as always to produce a weak alkaline solution on the addition of water. This renders the hydrosulfites stable and is the essential feature of my invention.

If stable anhydrous hydrosulfites have been hitherto obtained, it is quite clear that the "salting out" process by which they have been obtained is essentially different from mine since I use but a trace of the sodium or other salt, while these other processes require a very strong concentration of the sodium salt to induce the crystallization. Furthermore, the presence of the alkali has always been regarded as a disadvantage and impurity and has been washed out of the final product.

To secure the hydrosulfite in commercial form as a paste or powder, I proceed by evaporation, preferably in a vacuum, and carry the same as far as desired. The resultant product contains in the same proportion as when in solution, the acid by which the hydrosulfite is rendered stable.

Ammonia, anilin, pyridin, chinolin, etc. act in the same manner as the socalled neutral salts of weaker acids.

Of course the use of metallic salts which are reduced by hydrosulfurous acid is excluded from my process.

Of this class are cupricoxid, ferric oxid, maryanic oxid, etc. and their salts.

I claim as my invention:

1. The process of making stable hydrosulfite mixtures consisting in adding thereto as a permanent admixture the salt of an acid weaker than sulfurous or hydrosulfurous acid in less quantity than is necessary to salt out the hydrosulfite in anhydrous form.

2. The process of making stable hydrosulfite mixtures which consists in adding thereto as a permanent admixture the salt of an acid weaker than sulfurous or hydrosulfurous acid in less quantity than is necessary to salt out the hydrosulfites in anhydrous form, and in evaporating the solution to obtain the hydrosulfite and salt in a solid form.

3. The process of making stable hydrosulfite mixtures which consists in adding thereto as a permanent admixture the salt of an acid weaker than sulfurous or hydrosulfurous in less quantity than is necessary to salt out the hydrosulfite in anhydrous form, and in evaporating the solution in a vacuum.

4. A product consisting of a hydrosulfite admixture which comprises a hydrosulfite salt and a permanently admixed salt of an acid weaker than sulfurous or hydrosulfurous acid in less quantity than is necessary to salt out the hydrosulfite in anhydrous form.

5. A product consisting of a substantially solid hydrosulfite admixture which comprises a hydrosulfite salt and a permanently admixed salt of an acid weaker than sulfurous or hydrosulfurous acid in less quantity than is necessary to salt out the hydrosulfite in anhydrous form.

In testimony whereof I have signed my name to this specification, in the presence of two subscribing witnesses.

WILHELM MAJERT.

Witnesses:
JOHANNES HEIN,
WOLDEMAR HAUPT.